Oct. 6, 1925.  
T. T. POPLAWSKI ET AL  
1,556,346  
KNOCKDOWN BIRD CAGE  
Filed Sept. 17, 1923
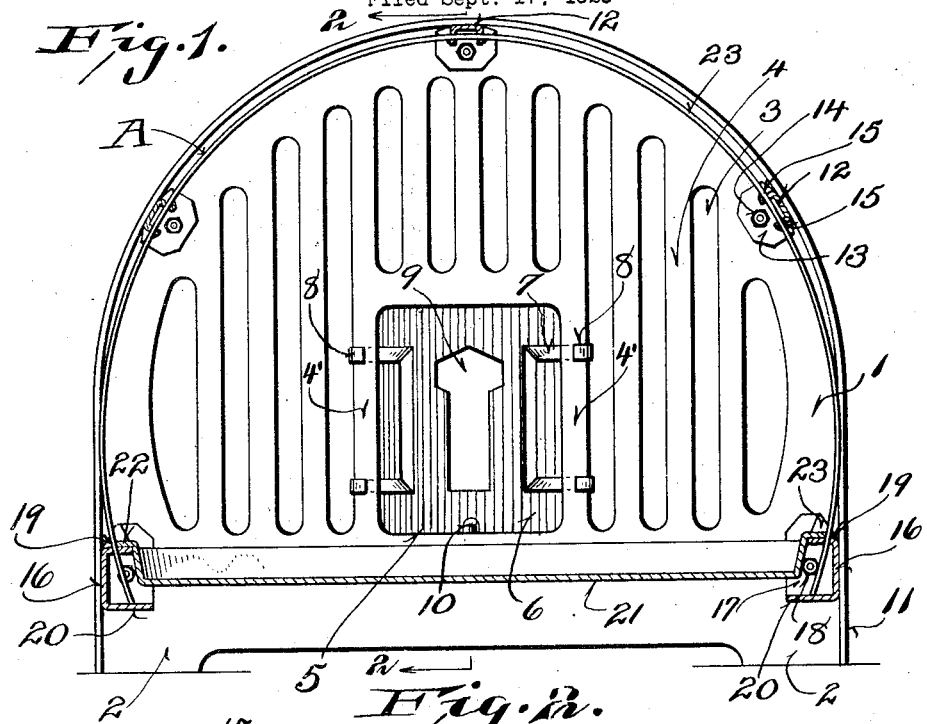
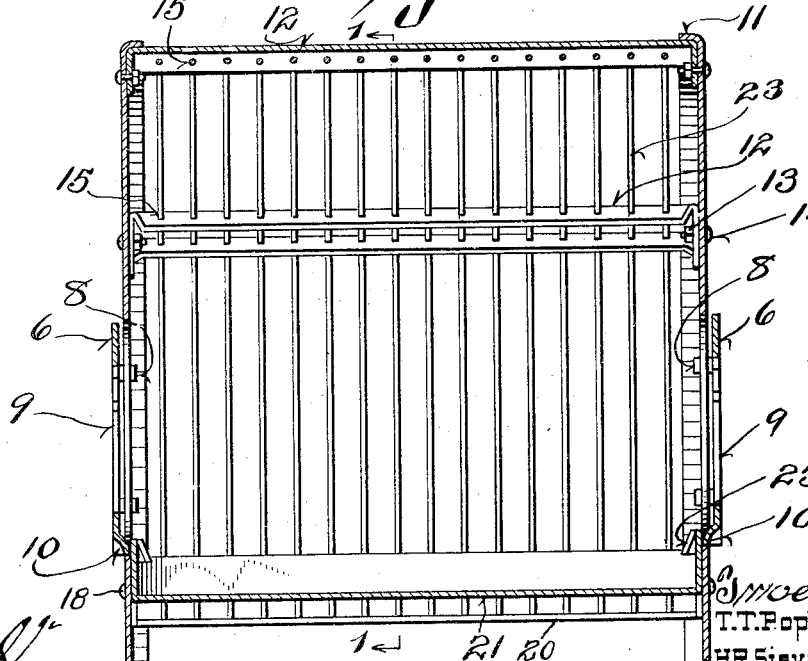

Patented Oct. 6, 1925.

1,556,346

UNITED STATES PATENT OFFICE.

THEODORE T. POPLAWSKI AND HENRY R. SIEVERKROPP, OF RACINE, WISCONSIN.

KNOCKDOWN BIRD CAGE.

Application filed September 17, 1923. Serial No. 663,169.

*To all whom it may concern:*

Be it known that we, THEODORE T. POPLAWSKI and HENRY R. SIEVERKROPP, both citizens of the United States, and residents of Racine, in the county of Racine and State of Wisconsin, have invented certain new and useful Improvements in Knockdown Bird Cages; and we do hereby declare that the following is a full, clear, and exact description thereof.

This invention relates to bird cages and is particularly directed to a knock-down bird cage.

Objects of this invention are to provide a knock-down bird cage which may be shipped flat, which may be most readily assembled, which is made of standard material such as sheet metal and wires, which may be made in any desired length, which does not require soldering, and in which waste of material during manufacture is minimized.

An embodiment of the invention is shown in the accompanying drawing, in which:—

Figure 1 is a transverse sectional view through the assembled cage, such view corresponding to a section on the line 1—1 of Figure 2.

Figure 2 is a longitudinal sectional view, such view corresponding to a section on the line 2—2 of Figure 1.

The bird cage comprises stamped sheet metal ends 1 whose upper portion may be semi-circular and whose lower portion continues straight downwardly. This lower portion is cut out adjacent its bottom to provide feet 2. These stamped ends are punched out, as indicated at 3, to provide a series of bars 4. The approximate middle portion of the ends are also punched out to provide a rectangular door way 5 and the removed portion 6 is utilized to form a door. The door is equipped with a plurality of arms 7 which are struck up and are folded laterally, as shown in Figure 1. These arms are again folded inwardly to provide tongues 8 which grip around the vertical members 4′ adjacent the door way. The door, it will be seen, may, therefore, be slid upwardly to give access to the cage and, if desired, may be completely removed by bending a pair of the tongues 8 outwardly and, thereafter, rocking the door from position. The central portion of the door is provided with a key hole slot 9 to receive the usual food and water receptacle. Adjacent the lower portion of the door, an inwardly struck portion 10 is provided, which as may be seen from Figure 2, is adapted to contact with the lower adjacent portion of the end and to thus limit the downward motion of the door. In order to provide the necessary rigidity for the end members and to permit their being formed from thin sheet metal, it is desirable that the edges be inturned to form a continuous flange 11 thus providing a finished appearance for the end members as well as additional strength.

The end members are joined by means of a plurality of longitudinally extending channel members 12 formed from sheet metal and having inwardly turned ends 13. These ends are secured against the inner side of the end members by means of bolts 14, and are preferably positioned in contact with the inner side of the flanges 11, as shown in the drawings. It is to be noted that the flanges of the channel members 12 are regularly apertured, as indicated at 15, for a purpose hereinafter to appear. The lower portion of the ends are joined by means of a pair of relatively large channel members 16 which are provided with inturned ends 17 secured to the end members by means of bolts 18. The upper flanges of these bottom channel members are apertured as indicated at 19, and their lower flanges 20 extend inwardly a greater distance than the upper flanges.

The bottom of the cage consists of a shallow pan 21 which is also pressed from sheet metal and is provided with lateral flanges 22 which rest upon the upper flanges of the channel member 16, as shown in Figure 1. If desired, the end members may have tongues 23 struck therefrom and folded over the adjacent portions of the bottom to hold the bottom in position. The cage is completed by means of a plurality of resilient wires 23 which are passed through the apertures 15 in the channel members 12 and through the apertures 19 in the channel members 16, and are of such length that their lower ends rests against and contact with the bottom flanges 20 of the channel members 16. These wires are inserted through the appropriate apertures after the remaining portions of the cage have been assembled. This may be most readily accomplished by threading the wires upwardly through the left hand channel member 12, through the upper channel member, through the right hand channel member, and downwardly into the channel member 16 on the right hand side of the cage. Thereafter, the portion of the wire marked "A" in Figure 1 may be drawn upwardly slightly between the left hand channel member 12, and the upper channel member and the lower end may then be readily passed through the aperture 19 in the left hand channel member 16 and may be allowed to engage the bottom flange 20 when the portion "A" is released and allowed to spring back into the position shown in Figure 1 due to its inherent resiliency.

Obviously, any desired length of cage may be had by suitably choosing the longitudinally extending channel members to provide this desired length. In other words, various types or forms of cage may be had by employing this same construction and this general form.

It is intended that the cage shall be shipped to the bird dealer in a knock-down condition, and it will be seen from the description and drawings, that the parts may be readily laid in a flat position and will occupy a small amount of space. When the dealer wishes a cage, he can readily assemble one from this knock-down material in a very short period of time, and with a minimum of effort.

It will be seen that no particular skill is required in assembling the cage, that no soldered joints are presented, and that the operations required are of the simplest order.

It will further be seen that an attractive and sturdy cage has been provided and that the work involved in making this cage is very small.

Although one form of the invention has been described in considerable detail, it is to be understood that the invention may be variously embodied and is, therefore, to be limited only as claimed.

We claim:

1. A knock-down bird cage comprising end members formed of sheet material, a plurality of channel shaped longitudinal members detachably joined to said end members and provided with a plurality of aligned regularly spaced apertures, a plurality of resilient wires threaded through said apertures, all of said wires being retained in place solely by their inherent resiliency, the lowermost of said longitudinal members having inwardly extending members against which the ends of said resilient wires contact.

2. A knock-down bird cage comprising a pair of sheet metal stamped end members having marginal flanges extending completely around their outer edges, a plurality of channel shaped longitudinal members bolted to said sheet metal end members and provided with a plurality of regularly spaced aligned apertures, a plurality of resilient wires threaded through said apertures, the lowermost of said longitudinal members having relatively wide inwardly extending flanges adapted to engage the ends of said resilient wires when said resilient wires are threaded through said aligning apertures.

In testimony that we claim the foregoing we have hereunto set our hands at Milwaukee, in the county of Milwaukee and State of Wisconsin.

THEODORE T. POPLAWSKI.
HENRY R. SIEVERKROPP.